S. KARASICK.
FIXTURE FOR MAGNETIC CHUCKS.
APPLICATION FILED JUNE 30, 1917.
1,312,546.
Patented Aug. 12, 1919.
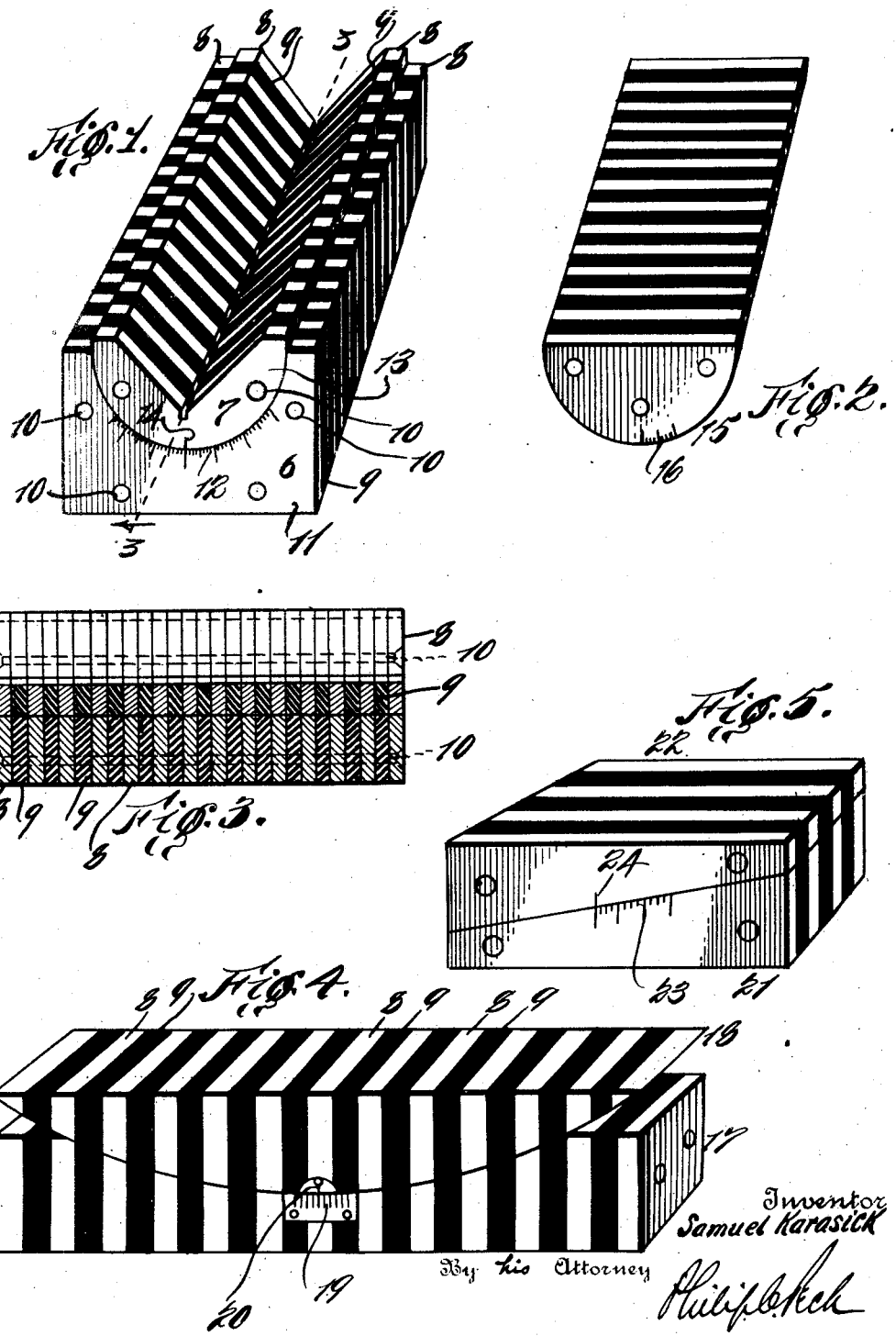
Inventor
Samuel Karasick
By his Attorney

UNITED STATES PATENT OFFICE.

SAMUEL KARASICK, OF NEW YORK, N. Y., ASSIGNOR TO THE KAR ENGINEERING COMPANY, OF NEW YORK, N. Y., A CORPORATION OF CONNECTICUT.

FIXTURE FOR MAGNETIC CHUCKS.

1,312,546.     Specification of Letters Patent.     Patented Aug. 12, 1919.

Application filed June 30, 1917. Serial No. 177,878.

*To all whom it may concern:*

Be it known that I, SAMUEL KARASICK, a citizen of the United States, and a resident of the city, county, and State of New York, have invented certain new and useful Improvements in Fixtures for Magnetic Chucks, of which the following is a specification, reference being made to the accompanying drawings, forming a part thereof.

My invention relates to improvements for use in connection with magnetic chucks designed to be clamped or held fast to the bed plate of a machine whereby articles of magnetic material may be securely held and clamped in operative position, while undergoing machining operations either lengthwise or crosswise of the face of the chuck, by means of improved fixtures capable of being moved in various positions on the chuck and of securely holding the articles in any desired position in these fixtures for such machining operations, which positions may be determined with great accuracy and quickness.

In my application for patent filed in the United States Patent Office March 28, 1917, Serial No. 158,079, I disclosed improved forms of fixture tools shown in the form of parallel bars, V-blocks, and angle irons, in which the iron or steel work for the machining operation was directly superimposed and held fast to the fixture, such fixture being freely movable over the face of the chuck. In my present improvement I have provided two coacting fixture blocks which are adjustably movable with respect to each other, the lower fixture blocks being freely movable upon the face of the chuck and may be positioned in any desired position thereon, while the upper fixture block holds the work and is placed upon the lower fixture block and is so formed as not only to be movable thereon but also to be adjustable in respect thereto according to a predetermined scale or relationship. The fixture blocks themselves are composed of alternate sections of soft iron or soft steel plates and a nonmagnetic material such as Babbitt metal, lead, copper, fiber, and securing these alternate sections together to form a complete fixture.

In the accompanying drawings Figure 1 is a perspective view of a V-block upper fixture constructed and mounted upon the lower fixture block in accordance with my present invention;

Fig. 2 is a perspective view of another form of upper fixture block semi-circular in vertical cross-section and adapted to be used in connection with the lower fixture block shown in Fig. 1;

Fig. 3 is a vertical cross-sectional view taken on the line 3—3 shown in Fig. 1 looking in the direction of the arrow;

Fig. 4 is a perspective view of another form of my invention; and

Fig. 5 is a perspective view of still another form of my invention.

Similar numerals refer to similar parts throughout the several figures.

Referring to Fig. 1, 6 indicates the lower fixture block which is adapted to rest on the face of the magnetic chuck (not shown), and 7 is the upper fixture block, both blocks being composed of alternate sections 8 of soft iron or soft steel, and alternate sections 9 of a non-magnetic material, such sections or plates being securely held together as shown by binder rods 10 composed of a non-magnetic material such as brass, copper or the like. In Fig. 1, the upper surface of the lower fixture block 6 is hollowed out in concave form as shown, the concavity being made cross-sectionally on the arc of a circle. The upper fixture block 7 has its under surface formed convexly, the convexity of the block 7 being adapted to slidingly coact in all positions with the concavity of the block 6. The top surface of the block 7 is V-shaped in cross-section within which the work for machining operations is held. The outer section 11 of the block 6 has formed thereon the protractor scale 12 while the outer section 13 of the block has the indicator 14 adapted to coact with the scale 12 as shown for angle settings. It is manifest that the work placed in the V-block 7 may be adjustably secured for the machining operation at a predetermined angle with respect to the face of the chuck by adjusting to scale the relative position of the block 7 upon the block 6. The magnetism of the chuck obviously retains the two fixture blocks 6 and 7 in place and also the work superimposed upon the block 7, since the magnetic lines enter the work piece through the magnetic sections 8 in the two fixture blocks 6 and 7, which sections should be maintained in alinement as shown in Fig. 3, when the block 7 is adjusted upon the hollow face of the block 6. In Fig. 2, the top face of the fixture block 15 is flat upon which the work is placed; the block 15 carries on the outer section a scale 16 which is adapted to coact with the scale 12 of the block 6. The work is placed upon the top flat surface of the block 15 and there securely held in any desired tilted position as has been heretofore explained with reference to the V-block 7.

In Fig. 4, I have shown a modified form of my invention in which the alternate sections 8 and 9 of magnetic and non-magnetic material respectively of both the lower fixture block 17 and the upper fixture block 18, extend at right angles to the axis of rotation of the upper block 18 as shown in this figure. The upper surface of the block 17 is concave and the under surface of the block 18 is convex, such concavity and convexity being equal so that the block 17 may always preserve a sliding contact with the block 18, the under surface of which rests upon and is freely movable over the face of the magnetic chuck. The block 17 carries the protractor scale 19 and the block 18 has the indicator 20, as shown. The movement of the block 17 upon the block 18 is necessarily limited to the width of the magnetic section plates 8 so as to preserve the magnetic lines from the chuck to the work piece on the top surface of the fixture block 17, this form being shown in which, for example, the taper on the work piece is adjusted according to the standard scale of ¼ inch to the foot.

In Fig. 5 I have shown another form of coacting fixture blocks for vertical adjustment of the work piece according to a predetermined scale. 21 is the lower fixture block and rests on the face of the chuck and has an inclined top surface, and 22 is the upper fixture block having an oppositely inclined under surface, the angles of inclination being equal so that the two blocks 21 and 22 may have a sliding contact each with the other. The block 21 carries the scale 23 and the block 22 the indicator 24. The work is placed upon the top surface of the block 22, and it is apparent that its horizontal position with relation to the face of the chuck may be vertically adjusted by moving the blocks 21 and 22 sidewise upon each other, the magnetic sections 8 meanwhile preserving their operative alinement with each other and with the poles of the magnetic chuck.

By my improved fixtures I have done away with any clamping operations, and the ready adaptability and simplicity of the coacting members provide a quick and accurate adjustment of the work to the bed of the machine for the usual cutting or grinding operation.

It will be understood that the structure here shown may be variously modified and changed without departing from the limits and advantages of my invention, provided the operation and coaction of the parts is substantially as indicated, and it will be also understood that the invention is not limited to any particular form or construction except in so far as such limitations are set forth in the claims.

I claim as my invention:—

1. A fixture for use with magnetic chucks comprising a lower fixture block movable in all directions on the face of the chuck, and an upper work-holding block coacting with, and movable relatively to, said first block, said blocks being each composed of alternate and complementary magnetic and non-magnetic plates whereby the complementary and contacting magnetic plates of each block are energized in all relative positions of the blocks by the energizing of the magnetic chuck.

2. A fixture for use with magnetic chucks comprising a lower fixture block movable in all directions on the face of the chuck, and a superimposed work-holding block coacting with, and movable relatively to, said first block, said blocks being each composed of alternate and complementary magnetic and non-magnetic plates whereby the complementary and contacting magnetic plates of each block are energized in all relative positions of the blocks by the energizing of the magnetic chuck.

3. A fixture for use with magnetic chucks comprising a lower fixture block movable in all directions on the face of the chuck, and an upper work-holding block coacting with, and movable in predetermined relationship to, said first block, said blocks being each composed of alternate and complementary magnetic and non-magnetic plates whereby the complementary and contacting magnetic plates of each block are energized in all relative positions of the blocks by the energizing of the magnetic chuck.

4. A fixture for use with magnetic chucks comprising a lower fixture block movable in all directions on the face of the chuck, and a superimposed work-holding block coacting with and movable in predetermined relationship to, said first block, said blocks being each composed of alternate and complementary magnetic and non-magnetic plates whereby the complementary and contacting magnetic plates of each block are energized in all relative positions of the blocks by the energizing of the magnetic chuck.

5. A fixture for use with magnetic chucks comprising a lower fixture block movable in all directions on the face of the chuck, an upper work-holding block coacting with, and movable relatively to, said first block, said blocks being each composed of alternate and complementary magnetic and non-magnetic plates whereby the complementary and contacting magnetic plates of each block are energized in all relative positions of the blocks by the energizing of the magnetic chuck, a scale mounted on one of said blocks, and a pointer on the other of said blocks to coact with said scale whereby the relative positions of the blocks may be fixed to a predetermined scale.

6. A fixture for use with magnetic chucks comprising a lower fixture block movable in all directions on the face of the chuck, a superimposed work-holding block coacting with, and movable relatively to, said first block, said blocks being each composed of alternate and complementary magnetic and non-magnetic plates whereby the complementary and contacting magnetic plates of each block are energized in all relative positions of the blocks by the energizing of the magnetic chuck, a scale mounted on one of said blocks, and a pointer on the other of said blocks to coact with said scale whereby the relative positions of the blocks may be fixed to a predetermined scale.

SAMUEL KARASICK.

Witnesses:
GEORGE P. ROBBINS,
PHILIP C. PECK.